(12) United States Patent
Nakagawa et al.

(10) Patent No.: US 7,728,943 B2
(45) Date of Patent: *Jun. 1, 2010

(54) SUBSTRATE FOR A DISPLAY DEVICE, A METHOD FOR REPAIRING THE SAME, A METHOD FOR REPAIRING A DISPLAY DEVICE AND A LIQUID-CRYSTAL DISPLAY DEVICE

(75) Inventors: Hidetoshi Nakagawa, Tsu (JP); Toshihide Tsubata, Tsu (JP); Nobuyoshi Nagashima, Matsusaka (JP); Yuhko Hisada, Matsusaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 644 days.

This patent is subject to a terminal disclaimer.

(21) Appl. No.: 11/569,159

(22) PCT Filed: May 20, 2005

(86) PCT No.: PCT/JP2005/009705

§ 371 (c)(1),
(2), (4) Date: Nov. 15, 2006

(87) PCT Pub. No.: WO2005/116961

PCT Pub. Date: Dec. 8, 2005

(65) Prior Publication Data

US 2008/0192165 A1 Aug. 14, 2008

(30) Foreign Application Priority Data

May 28, 2004 (JP) .............................. 2004-160115

(51) Int. Cl.
*G02F 1/1343* (2006.01)

(52) U.S. Cl. .............................. 349/143; 349/39; 349/55
(58) Field of Classification Search .................. 349/39, 349/54, 55, 143, 144
See application file for complete search history.

(56) References Cited

U.S. PATENT DOCUMENTS 6,411,346 B1    6/2002    Numano et al.

(Continued)

FOREIGN PATENT DOCUMENTS

FR    2001-59954 A    7/2001

(Continued)

OTHER PUBLICATIONS

Official Communication issued in the corresponding International Application No. PCT/JP2005/009705, mailed on Nov. 29, 2006.

(Continued)

*Primary Examiner*—Andrew Schechter
(74) *Attorney, Agent, or Firm*—Keating & Bennett, LLP

(57) ABSTRACT

The present invention is a substrate for a display device comprising an active matrix substrate and an opposed substrate which are opposed to each other with a display medium layer interposed therebetween, said active matrix substrate including a pixel electrode arranged in a matrix shape on the side of the display medium layer and said opposed substrate including a common electrode opposing to the pixel electrode on the side of the display medium layer, wherein said substrate for a display device includes an electrode slit formed in one of the pixel electrode and the common electrode; and at least one of the electrical connecting portions of said electrode slit is provided outside of a light-blocking region.

15 Claims, 14 Drawing Sheets

U.S. PATENT DOCUMENTS

| | | |
|---|---|---|
| 6,661,488 B1 | 12/2003 | Takeda et al. |
| 6,717,648 B2 | 4/2004 | Tsukao |
| 6,888,602 B2 | 5/2005 | Takeda et al. |
| 7,499,140 B2 * | 3/2009 | Nakagawa et al. .......... 349/143 |
| 7,505,106 B2 * | 3/2009 | Nakagawa et al. .......... 349/143 |
| 2001/0019391 A1 | 9/2001 | Kim et al. |
| 2001/0052889 A1 | 12/2001 | Fukunishi |
| 2002/0131010 A1 | 9/2002 | Ozaki et al. |
| 2003/0202146 A1 | 10/2003 | Takeda et al. |
| 2004/0046914 A1 | 3/2004 | Hirota |
| 2004/0046915 A1 | 3/2004 | Takeda et al. |
| 2004/0075798 A1 | 4/2004 | Inoue et al. |
| 2004/0169806 A1 | 9/2004 | Takeda et al. |

FOREIGN PATENT DOCUMENTS

| | | |
|---|---|---|
| JP | 2-275927 A | 11/1990 |
| JP | 08-297306 A | 11/1996 |
| JP | 11-242225 A | 9/1999 |
| JP | 2000-147555 A | 5/2000 |
| JP | 2000-221527 A | 8/2000 |
| JP | 2001-083522 A | 3/2001 |
| JP | 2001-264811 A | 9/2001 |
| JP | 2002-203970 A | 7/2002 |
| JP | 2004-093654 A | 3/2004 |
| KR | 2003-48653 A | 6/2003 |
| KR | 2004-23535 A | 3/2004 |
| KR | 845668 A | 3/2008 |

OTHER PUBLICATIONS

Official communication issued in counterpart European Application No. 05743289.0, mailed on Apr. 3, 2009.

Nakagawa et al.: "Substrate for a Display Device, a Method for Repairing the Same, a Method for Repairing a Display Device and a Liquid-Crystal Display Device," U.S. Appl. No. 12/474,327, filed May 29, 2009.

Nakagawa et al.: "Substrate for a Display Device, a Method for Repairing the Same, a Method for Repairing a Display Device and a Liquid Crystal Display Device," U.S. Appl. No. 11/953,186, filed Dec. 10, 2007.

Nakagawa et al.: "Substrate for a Display Device, a Method for Repairing the Same, a Method for Repairing a Display Device and a Liquid Crystal Display Device," U.S. Appl. No. 12/953,190, filed Dec. 10, 2007.

Nakagawa et al.: "Substrate for a Display Device, a Method for Repairing the Same, a Method for Repairing a Display Device and a Liquid Crystal Display Device," U.S. Appl. No. 12/209,420, filed Sep. 12, 2008.

International Search Report issued in corresponding International Patent Application No. PCT/JP2005/009705, mailed Jul. 12, 2005.

* cited by examiner

SUBSTRATE FOR A DISPLAY DEVICE, A METHOD FOR REPAIRING THE SAME, A METHOD FOR REPAIRING A DISPLAY DEVICE AND A LIQUID-CRYSTAL DISPLAY DEVICE

BACKGROUND OF THE INVENTION

1. Field of the Invention

The present invention relates to a substrate for a display device, a method for repairing the same, a method for repairing a display device and a liquid crystal display device and, more particularly to a substrate for a display device which is suitably used in direct-vision type liquid crystal display devices such as a liquid crystal color television and projection-type liquid crystal display devices such as a liquid crystal projector, a method for repairing the same, a method for repairing a display device and a liquid crystal display device.

2. Description of the Related Art

As examples of liquid crystal display devices, there are color liquid crystal display devices including an active matrix (hereinafter, referred to as "AM") substrate having a plurality of switching devices such as thin-film transistors (hereinafter, referred to as "TFTs") formed thereon, a CF substrate having a color filter (hereinafter, referred to as "CF") layer of a plurality of colors and a common electrode which are laminated in order thereon, and a liquid crystal layer interposed between both the substrates. The AM substrate includes a plurality of pixel electrodes arranged in a matrix shape, the CF substrate includes a common electrode opposing to the pixel electrode and an alignment of the liquid crystal is controlled with the field intensity between both the electrodes.

In the event that a conductive foreign substance is intruded between the pixel electrodes formed on the AM substrate and the common electrode formed on the CF substrate in a conventional liquid crystal display device thus resulting in an electrical short-circuiting (hereinafter, referred to as "vertical leakage"), the electric potential difference between the pixel electrodes and the common electrode is nulled, thereby causing a liquid crystal molecule at the portion to be unoriented. This will cause pixel defects such as bright spots in normally-white type apparatuses (which display a white color when a voltage is not applied) and black spots in normally-black type apparatuses (which display a black color when a voltage is not applied). Such the vertical leakage is caused by a conductive foreign substance adhered during TFT processes, CF processes, liquid crystal processes and, in order to find the vertical leakage, it is necessary to conduct lighting inspections at the state where the TFT and CF panels are attached to each other. Furthermore, the probabilities of occurrences of the vertical leakage have been increased with increasing sizes of pixels in association with the increasing sizes of display devices which have been required in recent years and with decreasing cell gaps for realizing high-speed responses. With increasing probabilities of occurrences of the vertical leakage, the yields of panels have been reduced.

The pixel configuration of a conventional liquid crystal display device will be described by exemplifying the pixel configuration of an MVA (Multi-domain Vertical Alignment) type liquid-crystal displaying mode, on the basis of drawings.

MVA type display device employs a band-shaped component (an alignment control protrusion) provided on the CF substrate and a cut-out (a slit) in the pixel electrode provided on the AM substrate which are alternately arranged on these substrate surfaces and generate liquid crystal alignments having directions of director which are different from one another by 180 degrees by using the aforementioned component and the slit as boundaries for dividing the alignment of vertical-alignment type liquid crystals, wherein a plurality of domains having director directions which are different from one another by 180 degrees are provided within a single display pixel region to provide uniform visual angle characteristics (refer to, for example, JP-P No. 11-242225). As described above, the pixel electrode of an MVA type display device is provided with a plurality of slits for restricting the alignment of a liquid crystal molecule, and, for example, as illustrated in FIGS. 1-2, an electrode connecting portion between electrode slits (a pixel-electrode connecting portion) 12 is provided in order to provide a continuous electrode pattern within the pixel. In general, the pixel-electrode connecting portion 12 is provided around a pixel electrode 9 and an alignment defect (a disclination) and a light leakage near a data-signal wiring (signal line) 4 is collectively shielded by a light-blocking film called a black matrix provided on the CF substrate for alleviating reduction in the aperture ratio. However, a configuration of conventional MVA type pixel electrode has not enabled repairing a pixel suffering from the vertical leakage thus resulting in a defect on a pixel-by-pixel basis and therefore have been susceptible to improvements.

There is another aspect of an MVA type display device in which a protrusion for controlling alignment is provided on the AM substrate while a slit is provided in the electrode on the CF substrate. In this case, as illustrated in FIGS. 4-2, for example, the opposed electrode (common electrode) on the CF substrate is provided with a slit and the opposed electrode is continuous with the adjacent pixel. Therefore, in order to cut away a portion suffering from the vertical leakage, it is necessary to cut away the surrounding area of the pixel electrode having the portion. Therefore, there has been room for minimizing the to-be-cut portion and making the portion suffering from the vertical leakage to be a minute defect which is difficult to recognize as a defect.

There have been disclosed liquid crystal display devices capable of coping with occurrence of the vertical leakage by having a slit portion formed in the pixel electrode, in relation to a conventional technique for repairing a pixel defect (refer to, for example, JP-P No. 2000-221527, JP-P No. 2004-93654, and JP-P No. 2001-83522). However, the liquid crystal display devices in JP-P No. 2000-221527 and JP-P No. 2004-93654 utilize a slit provided at a portion outside of a light-blocking film where there has originally existed no slit and the pixel electrode is cut off resulting in expansion of the slit region. Therefore, these liquid crystal display devices have been susceptible to improvement for maintaining the display quality without inducing an alignment defect. Furthermore, there is a possibility of cutting off a data-signal wiring during cutting away a defective portion which may induce a line defect and, therefore, these apparatuses have been susceptible to improvements.

Further, with the liquid crystal display devices in JP-P No. 2000-221527 and JP-P No. 2001-83522, in the event of occurrence of a defect near the storage capacitor, if the pixel electrode on the portion is cut away, then the pixel electrode constituting the storage capacitor is cut away. Therefore, the apparatuses have been susceptible to improvement for causing the storage capacitor to work sufficiently to maintain the display quality even after repairs.

Further, the liquid crystal display devices in JP-P No. 2000-221527, JP-P No. 2004-93654 and JP-P No. 2001-83522 employ a configuration for supplying a drain electric potential to the pixel electrode through a contact hole near a transistor, and therefore they have been susceptible to improvement for enabling partially repairing the pixel electrode in the event of the vertical leakage between the transistor and the storage capacitor wiring. Further, they have been susceptible to improvement for sufficiently coping with, in addition to the vertical leakage, defect modes such as an electrical short-circuiting between the drain extracting electrode and the storage capacitor wiring (Cs) (hereinafter, referred to as "D-Cs leakage") and the electrical short-circuiting between the data-signal wiring and a capacitance electrode formed on the storage capacitor wiring.

SUMMARY OF THE INVENTION

The present invention was made in view of the aforementioned circumstances and aims at providing substrate for a display device, a method for repairing the same, a method for repairing a display device including the substrate for a display device and a liquid-crystal display device which enable making a portion suffering from a vertical leakage caused by adhesion of a conductive foreign substance to be a minute defect which is difficult to recognize as a defect, maintaining high display quality, increasing the yield and coping with defect modes such as a D-Cs leakage and a electrical short-circuiting between a signal line and the capacitance electrode formed on the storage capacitor wiring.

The present inventors have conducted various studies about a substrate for a display device which enable repairing a pixel defect caused by the vertical leakage and have noted that the pixel defect can be repaired even in the event of the vertical leakage, by providing an electrode slit in the electrode and utilizing a electrical connecting portion of the electrode slit for repairs. Namely, they have noted that, in the case of an active matrix substrate, for example, by configuring the pixel electrode to have an electrical connecting portion of a pixel-electrode slit (connecting portion between electrode slits) such that the pixel electrode can be divided into an electrode smaller than a single pixel, the pixel electrode suffering from the vertical leakage can be cut away at the aforementioned connecting portion to achieve repairs of the vertical leakage. Since such the vertical leakage is caused by various processes such as a TFT process, a CF process and a liquid crystal process, it is necessary to conduct an lighting inspection at the state where the TFT substrate and the CF substrate are attached to each other in order to find the vertical leakage, and also it is necessary to cut off the connecting portion between electrode slits (connecting portion of a pixel-electrode) from the back surface of the substrate. Such repairs are performed using laser irradiation. However, if an attempt is made to cut away a pixel electrode 9 having a portion suffering from a vertical leakage at the connecting portion between electrode slits 12 in a conventional liquid crystal display device for repairing the portion as illustrated in FIGS. 1-2, these connecting portion 12 must be cut off by laser irradiation (hereinafter, referred to as "laser cutting") from the back surface of the AM substrate, and therefore a metal wiring may be cut off together with the connecting portion 12. In view of these circumstances, the present inventors have found that the connecting portion between electrode slits 12 can be placed outside a light-blocking region where the metal wiring and so on are placed so that, even when the defective portion is cut away from pixel electrode 9 by laser irradiation from the back surface of the AM substrate, a signal line and a scanning line will not be cut off, thereby enabling cutting away the defective portion and making it a minute defect without affecting the adjacent pixel. Although the relocation of the connecting portion between electrode slits to outside the light-blocking region causes concern about an alignment defect of a liquid crystal molecule around the connecting portion, the display quality of all the pixels is not significantly influenced therefrom. Further, when the connecting portion between electrode slits 12 is cut off, the shape of the electrode slit become close to the desirable shape of an original pixel-electrode slit of MVA type apparatus, etc., and, therefore, the display quality of a normally-operating pixel electrode will not be hardly influenced after repairs. Thus, the inventors have sufficiently overcome the aforementioned problems.

Further, the present inventors have found that, by forming the light-blocking region from a light-blocking component which is not continuous with a light-blocking component of the adjacent pixel or by marking the position at which the connecting portion between electrode slits is placed with the shape of the light-blocking component, a position of the connecting portion can be made visually recognizable even when the connecting portion is placed within the light-blocking region, thereby enabling performing repairs and obtaining similar effects, and thus they have reached the present invention.

Further, the substrate for a display device according to the present invention can also sufficiently cope with a D-Cs leakage and failure modes such as an electric short-circuiting between the signal line and the capacitance electrode formed on the storage capacitor wiring, as well as the vertical leakage.

Namely, the present invention is a substrate for a display device comprising an active matrix substrate and an opposed substrate which are opposed to each other with a display medium layer interposed therebetween, said active matrix substrate including a pixel electrode arranged in a matrix shape on the side of the display medium layer and said opposed substrate including a common electrode opposing to the pixel electrode on the side of the display medium layer, wherein said substrate for a display device includes an electrode slit formed in one of the pixel electrode and the common electrode; and at least one of the electrical connecting portions of said electrode slit is provided outside of a light-blocking region.

Further, the present invention is a substrate for a display device comprising an active matrix substrate and an opposed substrate which is opposed to each other with a display medium layer interposed therebetween, said active matrix substrate including a pixel electrode arranged in a matrix shape on the side of the display medium layer and said opposed substrate including a common electrode opposing to the pixel electrode on the side of the display medium layer, wherein said substrate for a display device includes an electrode slit formed in one of the pixel electrode and the common electrode; and at least one of electrical connecting portions of said electrode slit is provided within a light-blocking region formed from a light-blocking component which is not continuous with a light-blocking component of the adjacent pixel.

Further, the present invention is a substrate for a display device comprising an active matrix substrate and an opposed substrate which is opposed to each other with a display medium layer interposed therebetween, said active matrix substrate including a pixel electrode arranged in a matrix shape on the side of the display medium layer and said opposed substrate including a common electrode opposing to the pixel electrode on the side of the display medium layer, wherein said substrate for a display device includes an electrode slit formed in one of the pixel electrode and the common electrode ; and at least one of the electrical connecting portions of said electrode slit is provided within a light-blocking region and the position at which the at least one electrical connecting portion is placed is marked by a shape of light-blocking component.

BRIEF DESCRIPTION OF THE DRAWINGS

FIGS. 1-2 is a cross sectional view schematically illustrating a shape of a pixel electrode on the substrate for a display device according to the present invention for use in a conventional MVA type liquid display device.

FIG. 2 is across sectional view schematically illustrating a configuration of a liquid crystal display device 100 according to a first embodiment of the present invention.

FIGS. 4-1 is a plan view schematically illustrating a shape of a opposed electrode on a CF substrate included in a liquid crystal display device according to a second embodiment of the present invention.

FIGS. 4-2 is a plan view schematically illustrating a shape of an opposed electrode on a CF substrate included in a conventional liquid crystal display device.

DETAILED DESCRIPTION OF PREFERRED EMBODIMENTS

Figure 1:
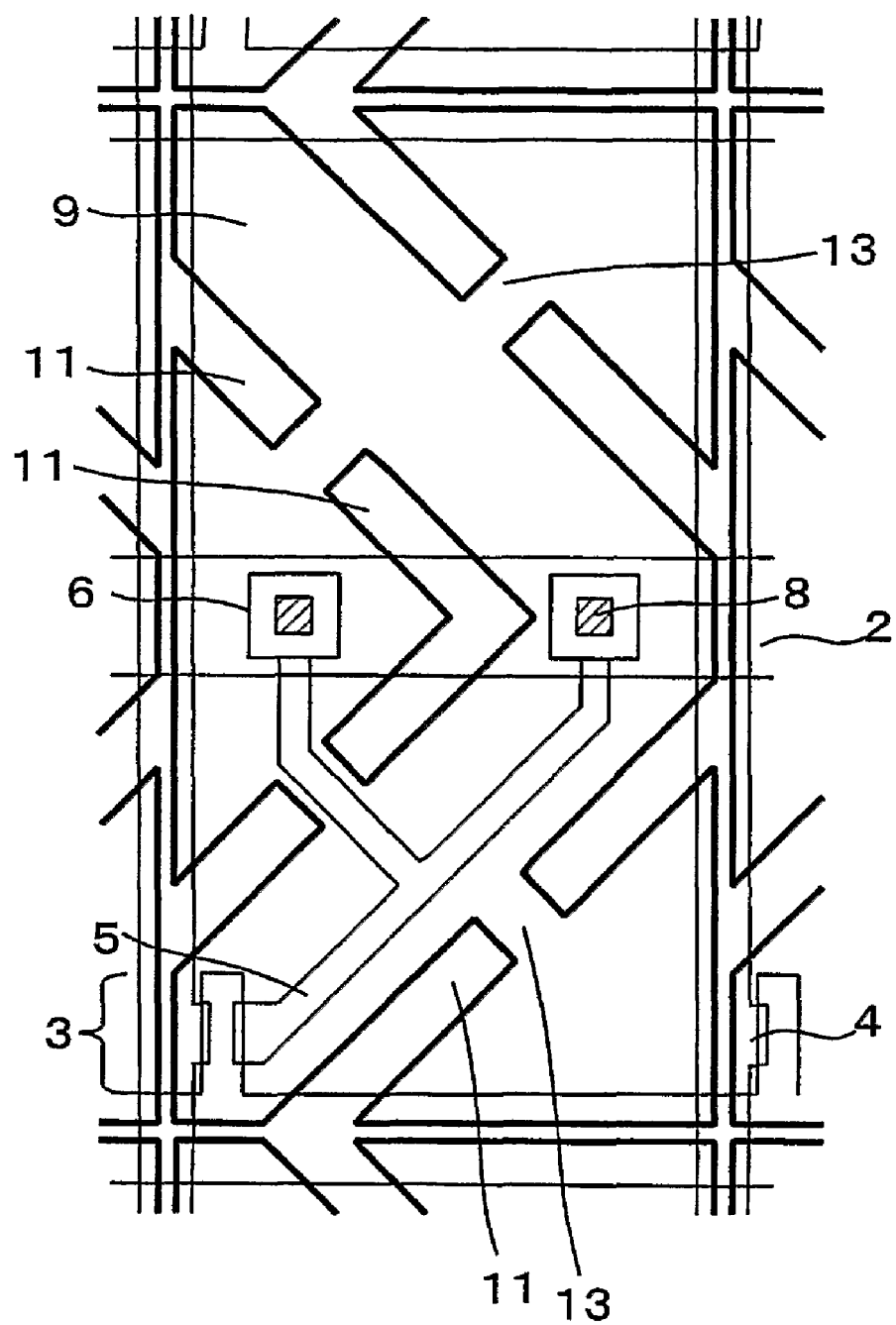
FIGS. 1-1 is a cross sectional view schematically illustrating a shape of a pixel electrode on the substrate for a display device according to the present invention.

A substrate for a display device according to the present invention is a substrate for use in a display device comprising an active matrix substrate and an opposed substrate which are opposed to each other with a display medium layer interposed therebetween, wherein said active matrix substrate includes a pixel electrode arranged in a matrix shape on the side of the display medium layer and said opposed substrate includes a common electrode opposing to the pixel electrode on the side of the display medium layer. The display device to which this substrate for a display device is applied is preferably a liquid crystal display device employing a displaying system which divides an alignment of a liquid crystal molecule with an electrode slit formed in one of the pixel electrode and the common electrode and is preferably an MVA type liquid crystal display device, for example. Further, the driving system for the substrate for a display device may be a dot-inversion type system or a line-inversion type system, etc. Further, the display device may be a reflection-type or reflection/transparent type display device, as well as a transparent-type display device. Also, the substrate for a display device according to the present invention is applicable to a display device including a pixel electrode such as an electrophoretic display device, as well as a liquid crystal display device. The substrate for a display device according to the present invention is used as an active matrix substrate or an opposed substrate included in a display device as aforementioned. The active-matrix substrate may be a TFT (thin-film transistor) array substrate, etc., and the opposed substrate may be, for example, a color filter substrate, etc.

The aforementioned substrate for a display device includes an electrode slit formed in one of the pixel electrode and the common electrode and, preferably, the electrical connecting portion of the electrode slit (connecting portion between electrode slits) is formed to be such dimensions that the electrode divided by the electrode slit can be separated by laser cutting. The electrode slit is formed in the pixel electrode in the case where the substrate for a display device according to the present invention is an active matrix substrate while the electrode slit is formed in the common electrode (opposed electrode) in the case where the substrate for a display device according to the present invention is an opposed substrate.

There are three aspects of the electrical connecting portion of the aforementioned electrode slit: (1) an aspect where the electrical connecting portion is provided outside of a light-blocking region, (2) an aspect where the electrical connecting portion is provided within a light-blocking region formed from a light-blocking component which is not continuous with a light-blocking component of the adjacent pixel and (3) an aspect where the electrical connecting portion is provided within a light-blocking region and the position at which it is placed is marked with the shape of the light-blocking component. The substrate for a display device according to the present invention may include, within the substrate, the electrical connecting portion of the electrode slit according to any one of the aforementioned aspects (1) to (3) and may include, within the substrate, the electrical connecting portion of the electrode slit according to two or more aspects. Therefore, there may exist, within a single pixel, a light-blocking component which is not continuous with the adjacent pixel according to the aforementioned aspect (2) and mark provided at the position at which the electrical connecting portion of the electrode slit is placed according to the aforementioned aspect (3). Further, in the present invention, the electrical connecting portion of the electrode slit may exist both inside and outside of the light-blocking region.

Further, the light-blocking region is not particularly limited and may be any region which shields transmitted light. For example, preferably, the light-blocking region is formed from at least one of the following light-blocking components; (a) a metal wiring formed on the active-matrix substrate, (b) a black matrix formed on one of the active matrix substrate and the opposed substrate and (c) a color filter of a plurality of colors laminated on one of the active matrix substrate and the opposed substrate. The light-blocking region may be formed on the substrate for a display device according to the present invention. Also, the light-blocking region may be formed on the opposed substrate in the case where the substrate for a display device according to the present invention is the active-matrix substrate while it may be formed on the active-matrix substrate in the case where the substrate for a display device according to the present invention is the opposed substrate.

With the aforementioned aspect (1), the connecting portion between electrode slits is provided outside of the light-blocking region. Consequently, a signal line and a scanning line will not be cut off, even if a defective portion is cut away. This enables cutting off a defective portion and making it a minute defect without affecting the adjacent pixel and also significantly reduces the influences on the display quality of normally-operating a pixel electrode after repairs. Preferably, as illustrated in FIGS. 1-1, in the case where the aforementioned substrate for a display device is an active-matrix substrate, the connecting portion between electrode slits is provided within region where there exists no metal wiring formed on the substrate.

Figure 6:
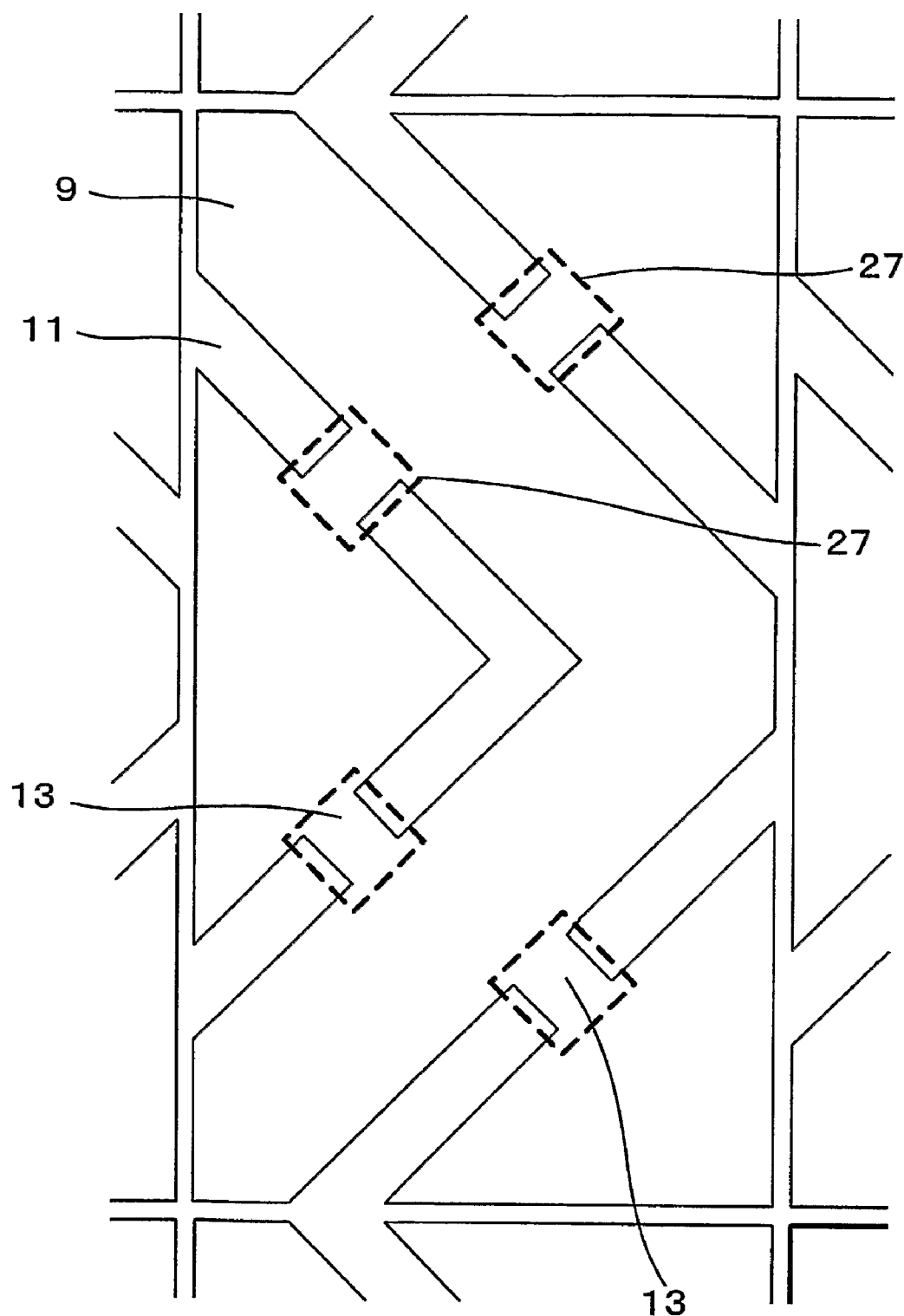
FIG. 6 is a plan view schematically illustrating a shape of a pixel electrode on a substrate for a display device according to a fourth embodiment of the present invention.

With the aforementioned aspect (2), the connecting portion between electrode slits is placed under a light-blocking component which is not continuous with the light-blocking component of the adjacent pixel. More specifically, as illustrated in FIG. 6, for example, the connecting portion between electrode slits provided at a region where there is no metal wiring is placed under a light-blocking component such as a black matrix. With this aspect, it is possible to prevent a light leakage, etc. Further, the light-blocking component (light-blocking part) may be a metal wiring, a black matrix, a overlapping of a plurality of colors in a color filter, etc. Further, with the aforementioned aspect (2), the light-blocking region in which the connecting portion between electrode slits is provided may be formed from a light-blocking part which is not continuous with the adjacent pixel. In general, there exist, on the substrate, both a light-blocking part which is not continuous with the adjacent pixel and a light-blocking part continuous with the adjacent pixel. In such a case, the light-blocking part which is not continuous with the adjacent pixel and a light-blocking part continuous with the adjacent pixel may be made of either the same material or different material.

With the aforementioned aspect (3), the position at which the connecting portion between electrode slits is placed is marked with the shape of a light-blocking component. Consequently, even when the connecting portion between electrode slits is provided within a light-blocking region, it is possible to recognize the to-be-repaired portion under the light-blocking part. The mark made by the shape of a light-blocking component is not particularly limited and may be any mark serving as a visual mark of the to-be-repaired portion. For example, the mark may be a triangular protrusion, a rectangular cut-out and protrusion, etc., or a discrete spherical pattern, etc., as well as a triangular cut-out illustrated as a mark 29 in FIG. 7. Further, the mark indicating the position at which the connecting portion between electrode slits is placed may be formed on the light-blocking component for blocking the electrical connecting portion of the electrode slit or may be formed from other component. As an example of using mark formed from other component, the BM (a black matrix) on the CF substrate is used for blocking the signal wiring and the position of the connecting portion between electrode slits placed within the light-blocking part (BM) is marked with the shape of the signal wiring on the AM substrate.

Among these aspects, the aforementioned aspect (1) is particularly preferable.

Hereinafter, more preferable aspects of substrate for a display device according to the present invention will be described.

The aforementioned substrate for a display device is preferably an active matrix substrate including a pixel electrode having an electrode slit formed therein. Such an active matrix substrate is preferably configured to include a scanning line, a signal line, a switching device and a storage capacitor wiring on an insulating substrate and further include an interlayer insulation film and a pixel electrode, wherein the switching device is provided at the intersection of the scanning line and the signal line and include a gate electrode connected to the scanning line, a source electrode connected to the signal line and a drain extracting electrode connected to the pixel electrode, the interlayer insulation film includes a plurality of contact holes which are connected to a plurality of capacitance electrodes placed above the storage capacitor wiring with an insulating layer interposed therebetween and connect the drain extracting electrode of the switching device to the pixel electrode, and the electrode slit is formed between the contact holes such that they straddle the storage capacitor wiring.

With the aforementioned aspect, the interlayer insulation film is provided on the signal line, the scanning line and the switching device, the contact hole is provided in the interlayer insulation film and the pixel electrode is provided on the interlayer insulation film. In the present invention, preferably, the interlayer insulation film between the signal line and the pixel electrode is formed to be sufficiently thick, in order to suppress capacitance increases even when the signal line and the pixel electrode are overlapped. This allows employing a configuration in which the signal line and the pixel electrode are overlapped, thereby enabling reducing the light-blocking film region (light-blocking region) for masking an alignment defect around the pixel electrode.

With the aforementioned aspect, the pixel electrode is connected to a drain extracting electrode extended from the switching device of respective pixels through the contact hole, which enables supplying a drain electric potential to the pixel electrode. Preferably, there are a plurality of drain extracting electrodes within a single pixel. Further, preferably, the drain extracting electrode is directly connected to the capacitance electrode under the interlayer insulation film. Namely, for example, as illustrated in FIGS. 1-1, a switching device 3 (for example, TFT device) is directly connected to a storage capacitor electrode 6 under the interlayer insulation film using a branched drain extracting electrode 5. Thus, in the event of a vertical leakage between the switching device 3 and a storage capacitor wiring 2, even when the portion suffering from the leakage is separated, the remaining pixel electrode can be used for display.

With the aforementioned aspect, the contact hole is connected to the respective a plurality of capacitance electrodes placed above the storage capacitor wiring with an insulating layer interposed therebetween and connect the drain extracting electrode of the switching device to the pixel electrode. Namely, with the aforementioned aspect, there are a plurality of capacitance electrodes formed on the storage capacitor wiring and the contact hole connected to the pixel electrode is provided on the respective capacitance electrodes. With the aforementioned aspect, the electrode slit in the pixel electrode is provided such that they straddle the storage capacitor wiring, between at least two contact holes of the a plurality of (two or more) contact holes. In the present application, the term "or more" includes the number preceding it. Further, preferably, the capacitance electrode connected to the aforementioned contact hole is configured to be discrete. With this configuration, even if the pixel electrode region connected to one contact hole is cut away due to a vertical leakage, the other capacitance electrode can function, thereby sufficiently suppressing degradation of the liquid crystal display quality due to the storage capacitor after repairs.

With the present invention, in the event of an electrical short-circuiting at a portion of the pixel electrode provided with the electrode slit due to a conductive foreign substance and so on, thus resulting in a pixel defect, the electrical connecting portion of the electrode slit is cut off by a method such as laser irradiation to electrically separate the region suffering from the electrical short-circuiting from the other region to repair the pixel defect. As a result, after the repairs, the pixel electrode suffering from the electrical short-circuiting is disconnected from the other pixel electrodes. The aspect after repairing the pixel defect in which the pixel electrode connected to the contact hole is disconnected from one another is also a preferred aspect of the present invention.

The substrate for a display device according to the aforementioned aspect is preferably configured such that the electrical connecting portions of the electrode slit exists on the drain extracting electrode. In this case, for example, in the event that a vertical leakage occurs at a pixel electrode region connected to the drain extracting electrode through the contact hole and thus it is necessary to cut off the region, only the connecting portion between electrode slits is required to be cut off by laser irradiation in order to cut away the pixel electrode suffering from the defect, without requiring individual laser-cutting of both the drain extracting electrode and the connecting portion between electrode slits. This can simplify the repair of the pixel defect.

The substrate for a display device according to the aforementioned aspect is preferably configured such that a plurality of signal lines near the electrode slit are placed in parallel and the respective signal lines are partially connected to one another. When the connecting portion between electrode slits to be cut off by laser irradiation exist near the signal line, the signal line may be cut off together with the connecting portion between electrode slits during laser-cutting. Therefore, it is desirable to take countermeasures for ensuring alternative path of a data-signal in the event that wiring is cut off. For example, it is preferable that, as illustrated in FIG. 8, a data-signal wiring 4 (signal line) near the to-be-repaired portion is placed in parallel and respective data-signal wirings 4 are partially connected to one another, so that, even if one wiring 4b of the data-signal wiring 4 is cut off during laser-cutting, a data signal can be circuited through the other wiring 4a. The number of signal lines at the portion to be cut off by laser irradiation is not particularly limited and may be any number more than one. Two signal lines may be placed as illustrated in FIG. 8 and more than two signal lines may be placed.

Figure 9:
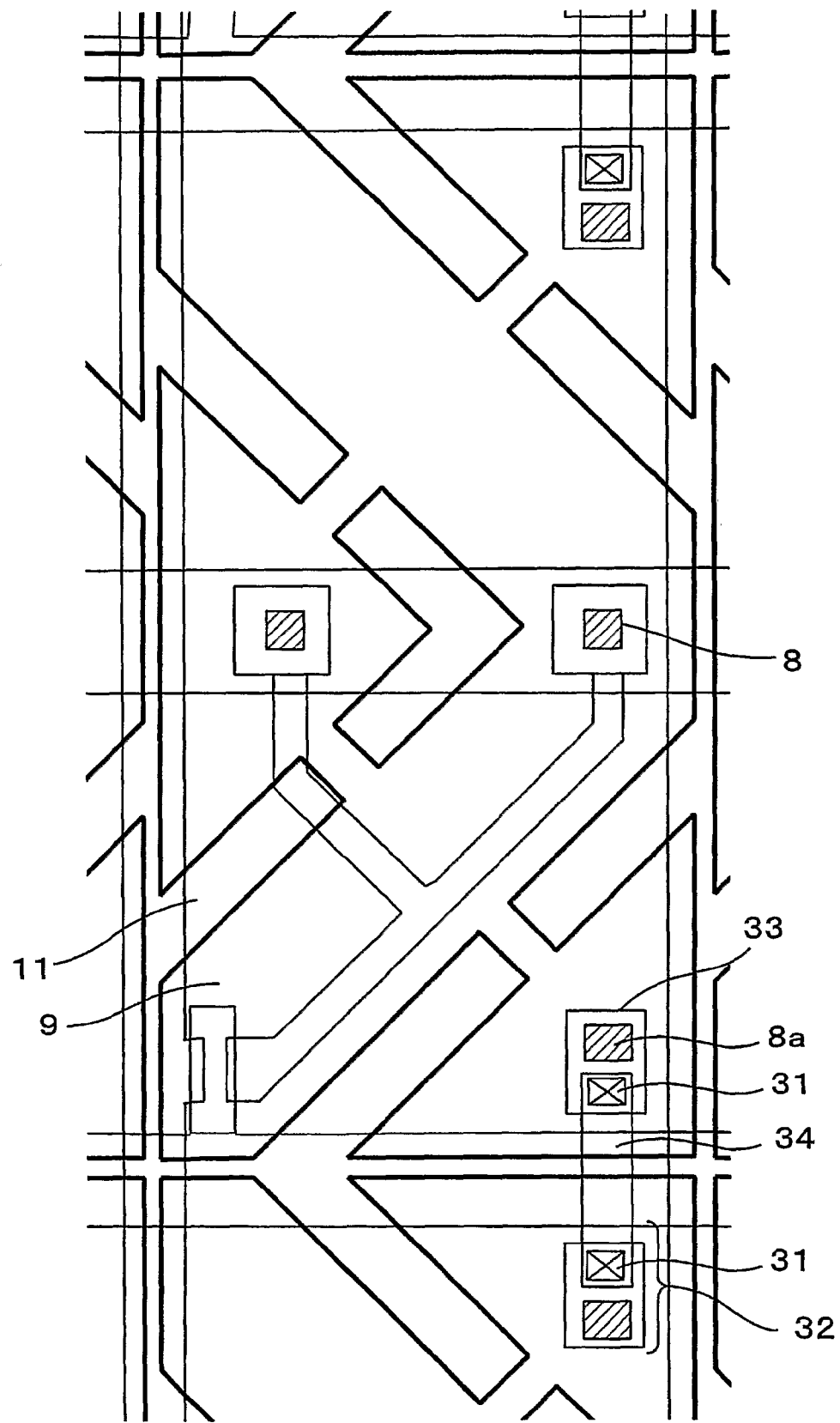
FIG. 9 is a plan view schematically illustrating a shape of a pixel electrode on a substrate for a display device according to a seventh embodiment of the present invention.

Further, the substrate for a display device according to the aforementioned aspect is preferably configured to include a repairing configuration for supplying a drain electric potential from the adjacent pixel to the pixel electrode provided with electrode slit. The repairing configuration may be, for example, a configuration including a pixel-connecting electrode bridging an adjacent pixel, through an insulating layer, a repairing-electrode portion provided in the both adjacent pixels on the layer, and a contact hole which is connected to the pixel electrode and provided on the repairing-electrode portion. In general, in the event of the vertical leakage within the pixel electrode connected to the contact hole which is sources for supplying the drain electric potential to the pixel electrode, if the portion is cut away, then the remaining pixel electrode will not be fed with a signal, resulting in a defect over the entire pixel. In this case, for example, as shown in FIG. 9, by providing the repairing configuration for supplying the drain electric potential from the adjacent pixel such as a contact configuration 32 for connecting the adjacent pixel to each other, in the event of a failure of the pixel electrode connected to the contact hole 8, this pixel electrode can be separated by laser-cutting and then the intersecting portions 31 between the electrodes 33 connected to the contact holes 8a and the wiring 34 placed between the electrodes 33 of the adjacent pixel such that it intersects the electrodes 33 can be brought into conduction by laser irradiation in order to supply a substantially-normal drain electric potential to the remaining pixel electrode to operate them, thereby sufficiently suppressing degradation of the display quality.

Preferably, the aforementioned substrate for a display device is an opposed substrate including a common electrode which is provided with the electrode slit. Further, preferably, the aforementioned opposed substrate is a color filter (CF) substrate. Preferably, the aforementioned electrode slit is formed outside of the light-blocking region. By providing a slit pattern in the common electrode (opposed electrode) outside the light-blocking region as described above, the common electrode can be divided into narrower region. In such a case, it is preferable that the connecting portion between electrode slits (dividing portion) is also provided outside the light-blocking region.

Figures 1, 4:
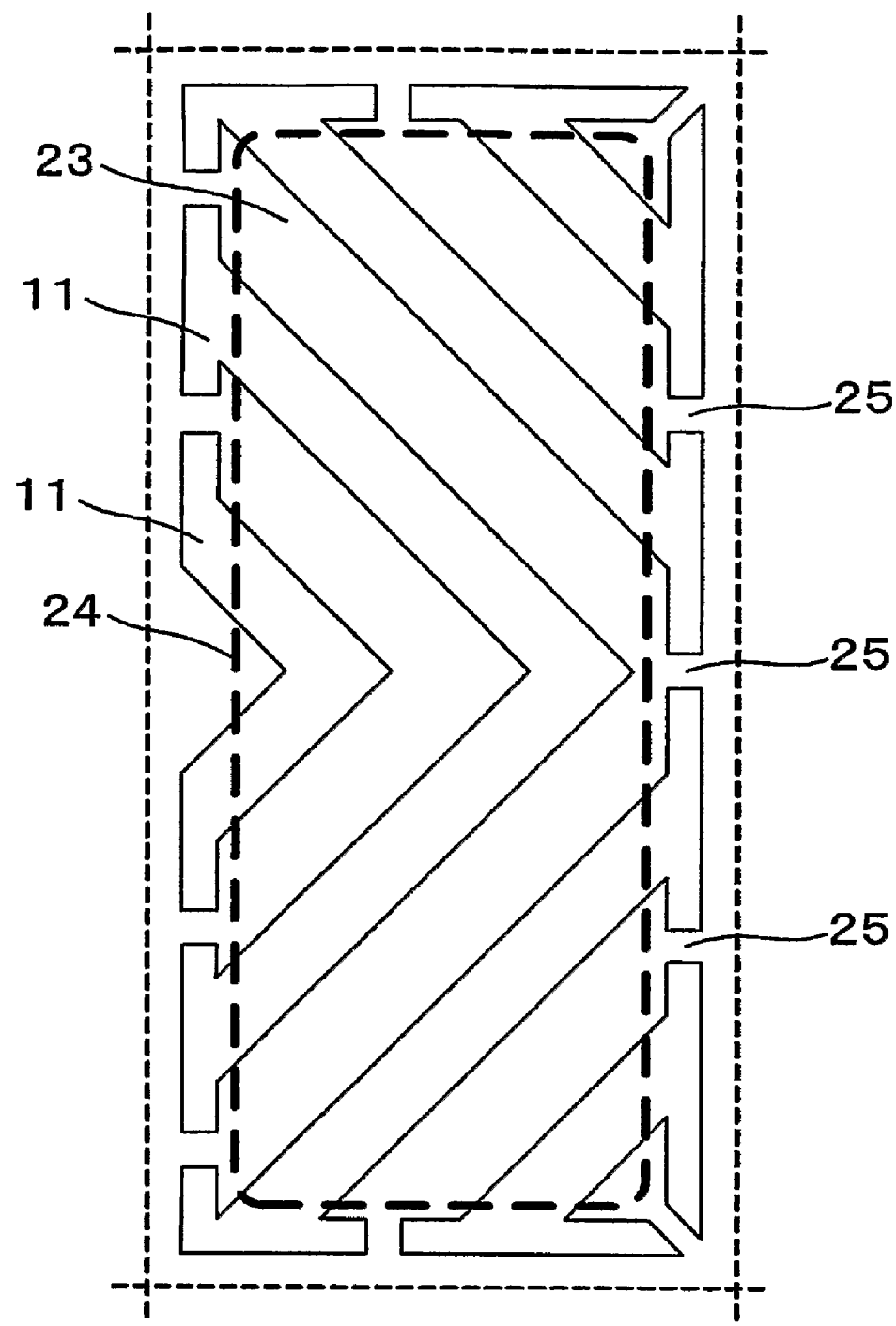
Figures 2, 4:
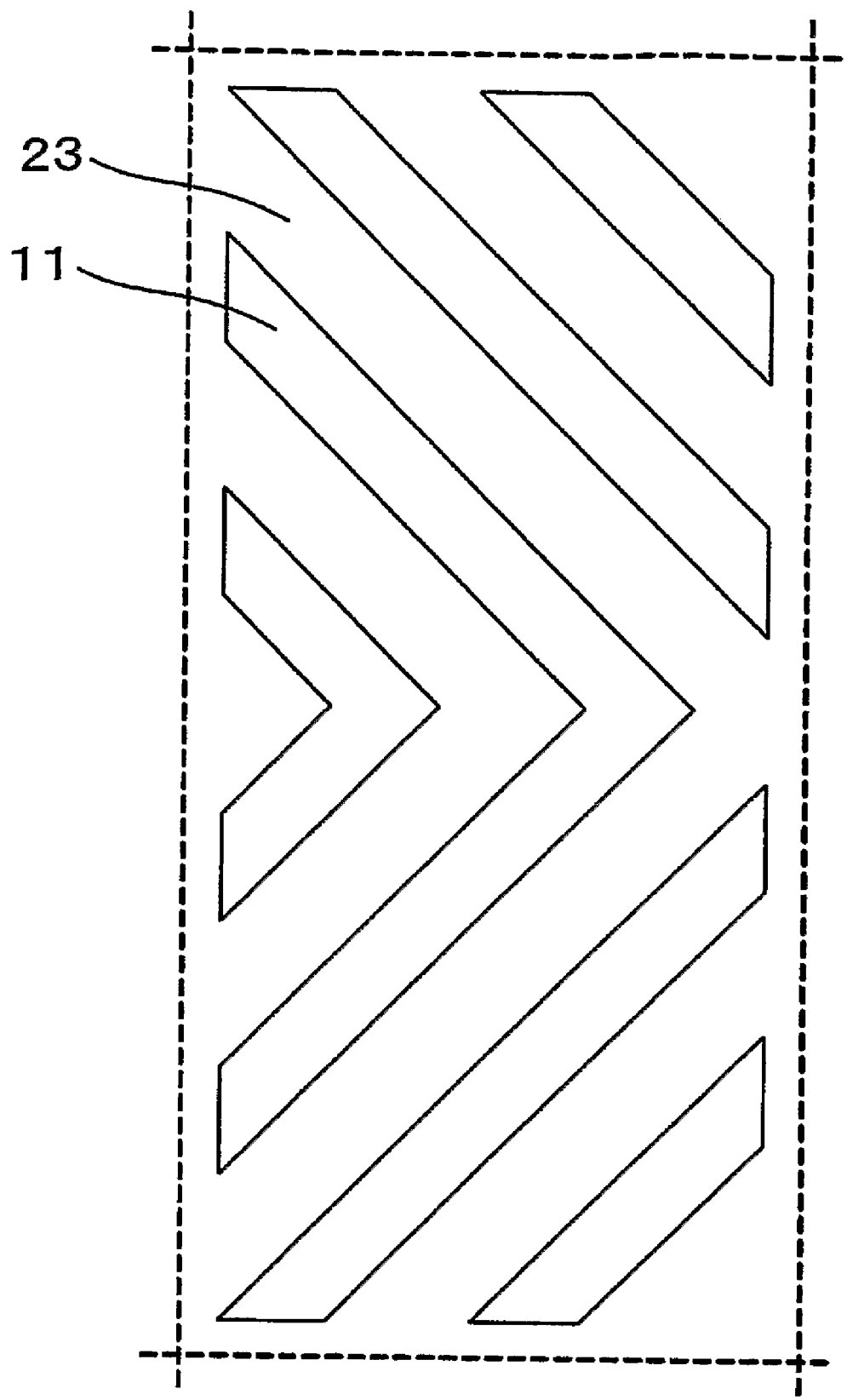

The electrical connecting portion of the aforementioned electrode slit may be provided according to the aforementioned aspects (1) to (3), and they are preferably placed to surround the electrode region 24 as illustrated in FIGS. 4-1, for example. In this case, in the event of the vertical leakage within the electrode region 24, the portion suffering from the vertical leakage can be cut away by laser-cutting the slit connecting portions 25 therearound which can make this portion to be a minimum independent electrode. In this case, the output and the wavelength of laser are varied depending on the film thickness and the film quality of the CF and must be adjusted for certainly achieving cut off.

In the aforementioned aspect, when the coloring layer is formed on the CF substrate as conventional, the electrode pattern on the red coloring layer will not absorb the energy of infrared laser thereby enabling repairs using infrared laser for the electrode, while the other coloring layers (green and blue, etc.) will absorb the energy of infrared laser and thus may be cut off. Therefore, it is desirable to take countermeasures against this, for example, by placing a light-blocking metal on the substrate (AM substrate) opposing to the CF substrate in order to shield a light leakage after laser-cutting repairs. By employing such a substrate for a display device according to this aspect for a monochrome-type display device used for roentgen applications or a display device having a CF-on-TFT (Color Filter on TFT Array) configuration having a CF pattern on the TFT substrate (as described in, for example, JP-P No. 2000-147555), laser-cutting repairs can be performed without problems.

The present invention is further a method for repairing a display device having short-circuiting in the substrate for a display device, wherein, in the event of the occurrence of the electrical short-circuiting between the electrodes on the active matrix substrate and the opposed substrate, between the electrodes on the active matrix substrate and the opposed substrate, the portion suffering from a failure is cut away by laser irradiation from the back surface of at least one of the substrates. In general, the vertical leakage is caused by a conductive foreign substance adhered during a TFT processes, a CF processes, a liquid crystal processes and, in order to find the vertical leakage, it is necessary to conduct a lighting inspection at the state where the active matrix substrate and the opposed substrate are attached to each other. Therefore, in the aforementioned repairing method, laser irradiation is applied from the back surface of any one of these substrates, namely from the glass surface side.

Preferably, such laser irradiation is applied to the connecting portion between electrode slits provided in the substrate for a display device according to the present invention and, by cutting off the connecting portion between electrode slits around a defective portion with laser irradiation for cutting away the defective portion, the portion suffering from the vertical leakage can be made a minute defect which is difficult to recognize as a defect, thereby suppressing degradation of the display quality of the display device and increasing the yield.

Preferably, in a method for repairing a display device, wherein, a fundamental harmonic wave (the wavelength is 1064 nm) of an yttrium-aluminum-garnet (YAG) laser which is an infrared radiation (IR) which can transmit glasses more easily than ultra-violet waves is used.

The present invention is further a method for repairing the electrical short-circuiting in the substrate for a display device, wherein, in the event of occurrence of the electrical short-circuiting between the drain extracting electrode and the storage capacitor wiring, the portion suffering from a failure is cut away by laser irradiation from the pixel-electrode side of the active matrix substrate. The substrate for a display device used for this repairing method is an active matrix substrate. In general, in the event of the electrical short-circuiting between the drain extracting electrode and the storage capacitor wiring (D-Cs leakage), the defective portion can be visually identified when the patterning of the active matrix substrate has been completed and therefore, in the aforementioned repairing method, laser irradiation is applied from the pixel-electrode side of the active matrix substrate, namely the surface opposite to the glass surface.

Figure 10:
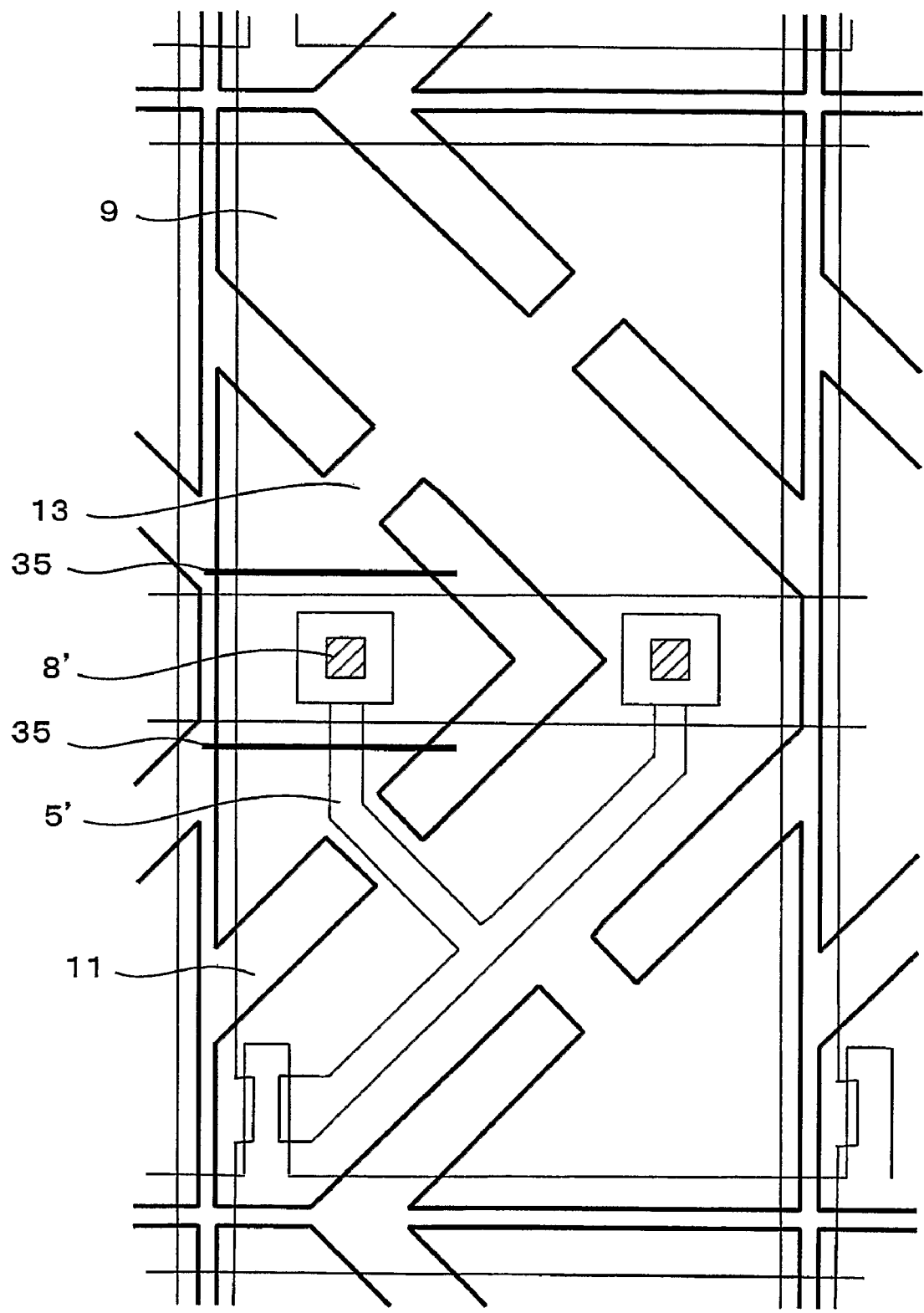
FIG. 10 is a plan view schematically illustrating a shape of a pixel electrode on a substrate for a display device according to a eighth embodiment of the present invention.

The portion to be irradiated with laser is not particularly limited and may be any portion which enables separating a defective portion. For example, as illustrated in FIG. 10, a surrounding area 35 of the pixel electrode on and around a contact hole 8' within which a D-Cs leakage have been visually observed may be cut off and the drain-extracting wiring 5' connected to the contact hole 8' may be cut off by laser irradiation. However, it is more desirable to cut off the connecting portion between electrode slits in the substrate for a display device according to the present invention, for example, the connecting portion between electrode slits 13 in FIG. 10, since this can sufficiently suppress an alignment defect. In the aforementioned method for repairing a substrate for a display device, it is preferable to use a fourth harmonic component (having a wavelength of 266 nm) of an yttrium-aluminum-garnet laser (YAG) laser.

Further, the present invention is a liquid-crystal display device including the substrate for a display device, wherein said liquid-crystal display device divides an alignment of a liquid crystal molecule by the electrode slit.

The aforementioned liquid crystal display device is preferably an MVA type liquid crystal display device. However, the liquid crystal display device is not particularly limited and may be any liquid crystal display device of a display type which divides the alignment of a liquid crystal molecule by the electrode slit formed in the pixel electrode. Further, the driving system for the liquid crystal display device may be a dot-inversion type system or a line-inversion type system. Further, the display device may be a reflection-type or reflection/transparent type display device, as well as a transparent-type display device.

The liquid crystal display device employs the aforementioned substrate for a display device as an active matrix substrate or an opposed substrate for making a defect such as the vertical leakage, the D-Cs leakage or the electrical short-circuiting between the capacitance electrode formed on the storage capacitor wiring and the signal line to be a minute defect which is difficult to recognize as a defect, thereby suppressing degradation of the display quality and increasing the fabrication yield.

The substrate for a display device according to the present invention is configured as described above and thus enables making a portion suffering from the vertical leakage caused by adhesion of a conductive foreign substance to be a minute defect which is difficult to recognize as a defect while maintaining excellent display quality and increasing the yield. Further, the substrate for a display device according to the present invention can also cope with a defect mode such as the D-Cs leakage and the electrical short-circuiting between the capacitance electrode formed on the storage capacitor wiring and the signal line and therefore can be suitably used for the liquid crystal panel and so on of a large-size liquid crystal television and so on which are required to have excellent panel quality.

Embodiments of the present invention will be described with reference to the drawings. Although the following embodiments will be described with respect to a transparent-type liquid crystal display device, the present invention is not limited to only these embodiments.

First Embodiment

Figures 1, 2:
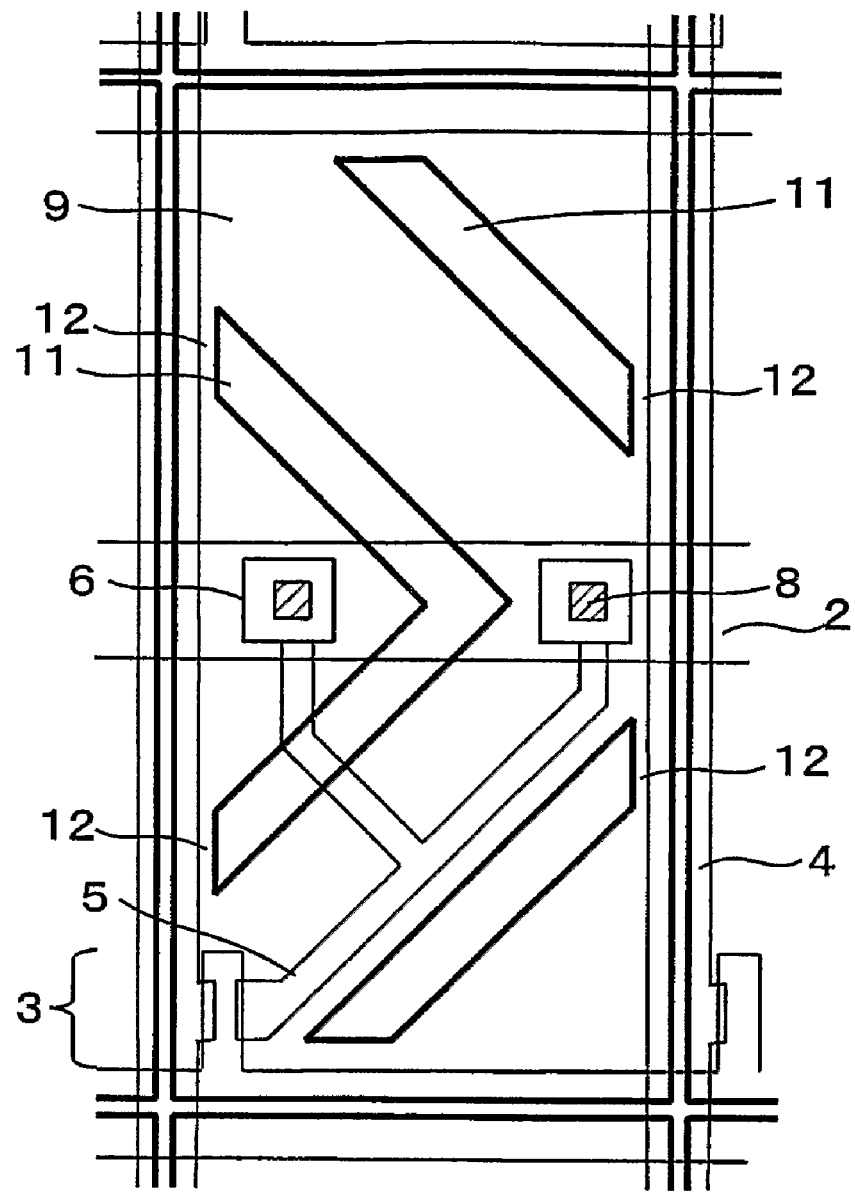
Figure 2:
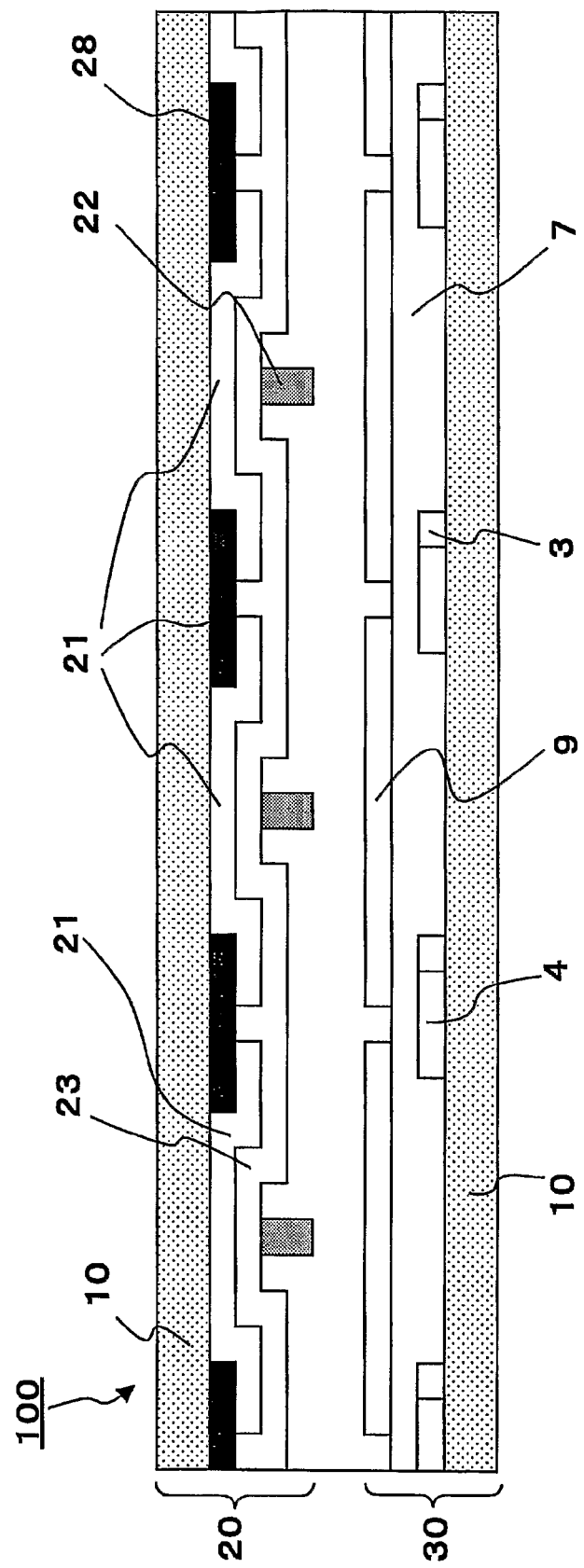
Figure 3:
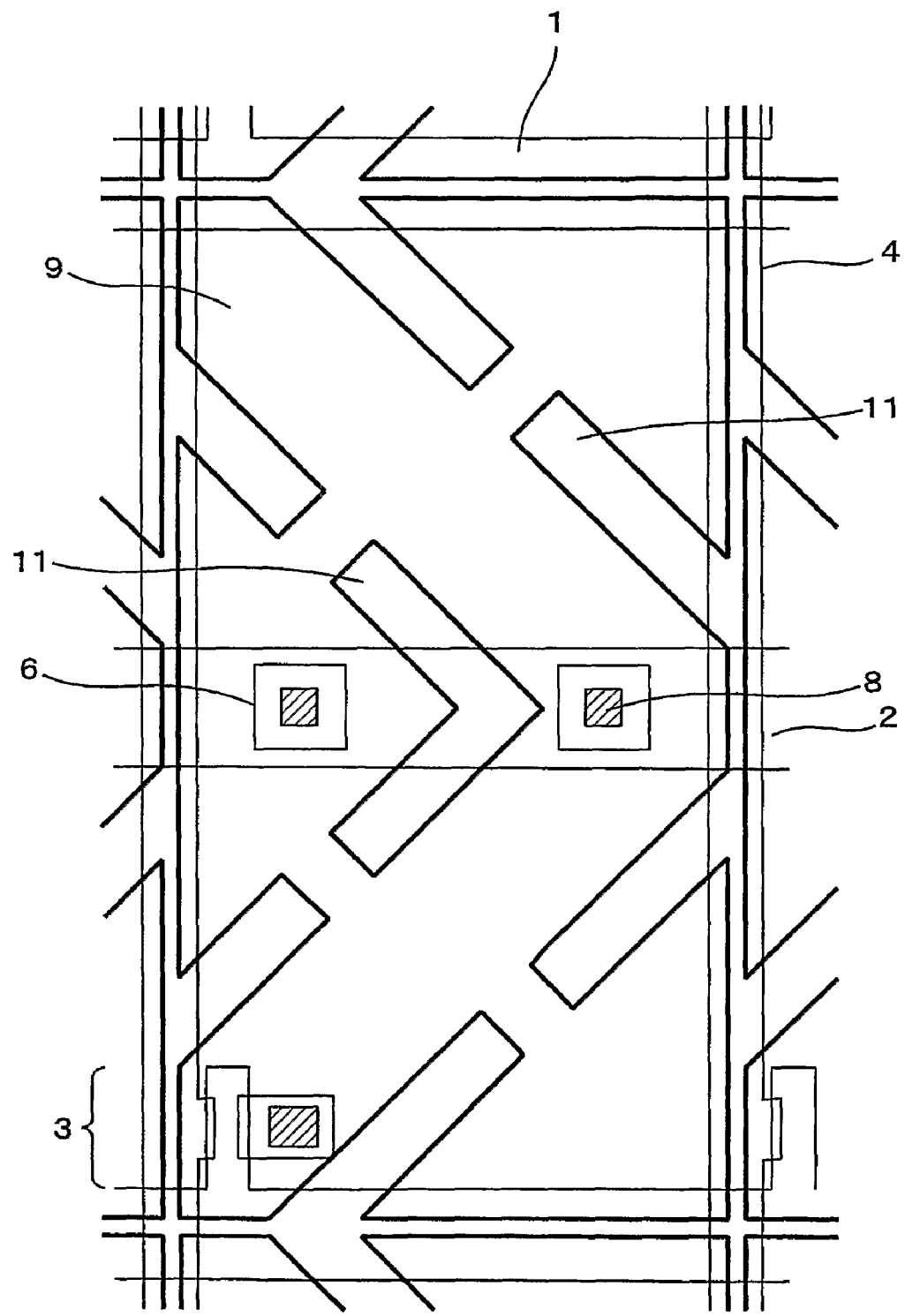
FIG. 3 is a plan view schematically illustrating a shape of a pixel electrode on an active matrix substrate included in the liquid crystal display device 100 according to the first embodiment of the present invention.

FIG. 2 is a cross sectional view schematically illustrating the configuration of a liquid crystal display device 100 according to the first embodiment of the present invention. FIG. 3 is a plan view schematically illustrating the shape of a pixel electrode on an active matrix substrate included in the liquid crystal display device 100 illustrated in FIG. 2.

The liquid crystal display device 100 includes a pair of opposing substrates, and a plastic bead or a column-shaped resin component provided on a color filter substrate 20, etc., are used as a spacer (not shown) to keep the space between the substrates constant. The liquid crystal display device 100 is an active-matrix type liquid crystal display device and includes the color filter substrate 20 and the active matrix substrate 30 including a switching device such as TFT.

Hereinafter, a method for fabricating the active matrix substrate 30 (AM substrate) 30 will be described.

A metal such as a Ti/Al/Ti laminated film is deposited on a transparent substrate 10 by sputtering, a resist pattern is formed by a photolithography method, dry etching is applied thereto using an etching gas such as a chlorine-based gas, and then the resist is removed to concurrently form a scanning-signal wiring (gate wiring, scanning line) 1 and a secondary capacity wiring 2. Then, a gate insulation film made of nitride silicon (SiNx), etc., an active semiconductor layer made of amorphous silicon, etc., and a low-resistance semiconductor layer made of amorphous silicon doped with phosphorus, etc., are deposited by chemical vapor deposition (CVD). Subsequently, a metal such as Al/Ti, etc., is deposited by sputtering, a resist pattern is formed by a photolithography method, dry etching is applied thereto using an etching gas such as a chlorine-based gas, and then the resist is removed to concurrently form a data-signal wiring (source wiring, signal line) 4, a drain-extracting wiring 5 and a storage capacitor forming electrode (secondary capacity electrode) 6. Further, a storage capacitor is constituted by a gate insulation film with a thickness of about 4000 angstroms sandwiched between the storage capacitor wiring 2 and the storage capacitor forming electrode 6. Then, the low-resistance semiconductor film is separated into a source and a drain by dry etching using a chlorine-based gas to form a TFT device 3. Next, an interlayer insulation film 7 made of acrylic photosensitive resin is applied thereto by spin coating, and then the contact hole 8 for establishing electrical contact between the drain-extracting wiring 5 and the pixel electrode 9 is formed by a photolithography method. The interlayer insulation film 7 has a thickness of about 3 micrometers. Further, the pixel electrode 9 and an alignment film (not shown) are formed in this order. Further, the present embodiment is an embodiment of an MVA (Multi-domain Vertical Alignment) type liquid crystal display device and the pixel electrode 9 made of ITO, etc., is provided with a slit pattern 11. More specifically, a film is deposited by sputtering, a resist pattern is formed by a photolithography method, and then it is etched using an etching liquid made of ferric chloride, etc., to form a pixel electrode pattern as illustrated in FIG. 3. As described above, the active matrix substrate 30 is provided.

On the other hand, the color filter substrate (CF substrate) 20 includes, on a transparent substrate 10, a color-filter layer 21 constituted by coloring layers of three primary colors (red, green and blue) and a black matrix (BM) 28, etc., a opposed electrode (common electrode) 23, an alignment film (not shown) and a protrusion for controlling alignment 22. A negative-type acrylic photosensitive resin liquid containing a carbon particle dispersed therein is applied to the transparent substrate 10 by spin coating and then is dried to form a black photosensitive resin layer. Then, the black photosensitive resin layer is exposed to light through a photo mask and then it is developed to form a black matrix layer (BM). At this time, the BM is formed such that an opening for the first coloring layer, an opening for the second coloring layer and an opening for the third coloring layer are formed at region where the first coloring layer (for example, the red layer), the second coloring layer (for example, the green layer) and the third coloring layer (for example, the blue layer) are to be formed respectively.

Next, a negative-type acrylic photosensitive resin liquid containing pigments dispersed therein is applied to the opening for the first coloring layer and then it is dried, exposed to light through a photo mask and developed to form the first coloring layer (the red layer). Then, the second coloring layer (for example, the green layer) and the third coloring layer (for example, the blue layer) are similarly formed and thus the formation of the color-filter layer 21 is completed. Then, the transparent electrode (opposed electrode) 23 made of ITO, etc., is formed by sputtering. Subsequently, a positive-type phenol novolac photosensitive resin liquid is applied thereto by spin coating and then it is dried, exposed to light through a photo mask and developed to form the protrusion for vertical alignment 22. As described above, the color-filter substrate 20 is provided.

In the present embodiment, as illustrated in FIG. 3, a connecting portion between electrode slits (electrical connecting portions of the electrode slit) 13 for the MVA system is placed outside of the metal wiring (data-signal wiring) 4. Consequently, even when a defective portion is cut off from the pixel electrode 9 by laser irradiation from the back surface of the AM substrate 30, the data-signal wiring 4 will not be cut off. This enables cutting off the defective portion, without affecting the adjacent pixel, to make the defective portion to be a minute defect. Further, although the relocation of the connecting portion between electrode slits 13 to outside the metal wiring 4 causes concerns about poor alignment around the connecting portion between electrode slits 13, the display quality of all the pixel is not influenced therefrom. Further, when the connecting portion between electrode slits 13 according to the present invention is cut off, the shape of the electrode slit become close to the shape of original pixel-electrode slit for the MVA system, thereby exerting extremely small influences on the display quality of normally-operating pixel electrode, after the repair.

Second Embodiment

FIGS. 4-1 is a plan view schematically illustrating the shape of pixel electrode on a CF substrate included in a liquid crystal display device according to the second embodiment of the present invention. In the present embodiment, it will be described that the present invention is applicable to a configuration in which a protrusion for vertical alignment 22 is provided on the electrode on the AM substrate of an MVA-type liquid crystal display device and the electrode 23 on the CF substrate opposing to the AM substrate is provided with a slit 11.

There is illustrated, in FIGS. 4-1, the pattern of the opposed electrode 23 on the CF substrate according to the present embodiment which enables cutting off a portion suffering from a vertical leakage. In FIGS. 4-1, a connecting portion between slits 25 is placed to surround an electrode region 24 and, in the event of occurrence of the vertical leakage within the electrode region 24, the portion suffering from the vertical leakage can be separated by laser-cutting the connecting portion between slits 25 which can make the portion to be a minimum independent electrode. In this case, the output and the wavelength of laser are varied depending on the film thickness and the film quality of the CF and must be adjusted for certainly achieving cutting off.

By employing such a configuration, laser-cutting repairs can be performed without problems for a monochrome-type display device used for a roentgen application or a display device having a CF-on-TFT (Color Filter on TFT Array) configuration having a CF pattern on the TFT substrate.

However, when the coloring layer is formed on the CF substrate as conventional, the red coloring layer will not absorb the energy of infrared laser thereby enabling repairs using infrared laser for the electrode pattern on the red coloring layer, while the other coloring layers (green and blue, etc.) will absorb the energy of infrared laser and thus may be cut off. Therefore, it is desirable to take countermeasures against this, for example, by placing a light-blocking metal on the opposed substrate in order to shield a light leakage after laser-cutting repairs.

Third Embodiment

Figure 5:
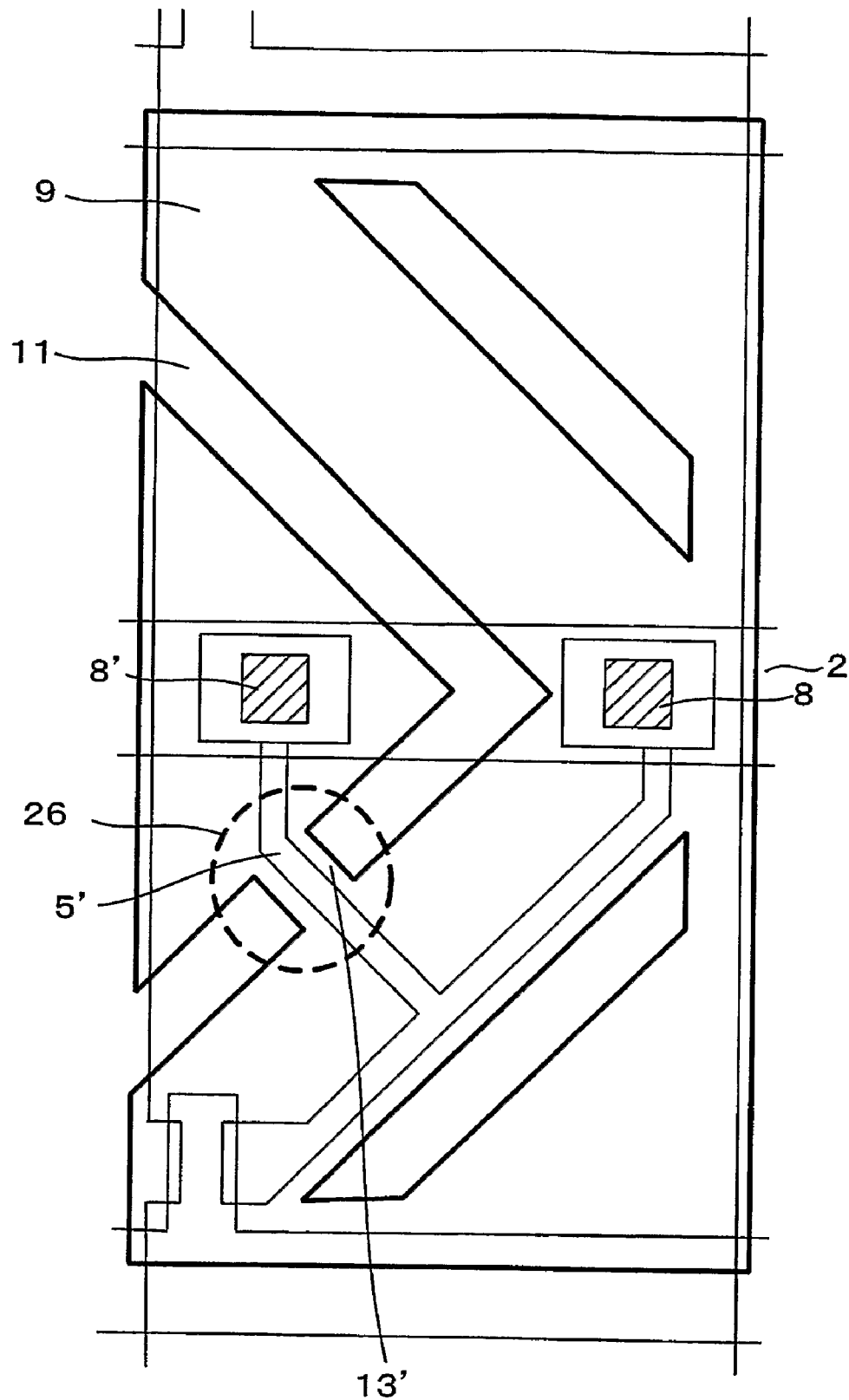
FIG. 5 is a plan view schematically illustrating a shape of a pixel electrode on a substrate for a display device according to a third embodiment of the present invention.

FIG. 5 is a plan view schematically illustrating the shape of pixel electrode on the substrate for a display device according to the third embodiment of the present invention.

In repairing a vertical leakage, the inter-electrode connecting portion is cut off by laser irradiation from the back surface of the substrate at the state where the TFT substrate and the CF substrate are attached to each other and therefore, when there exist a metal wiring between the connecting portion and the substrate, the metal wiring may be cut off together with the connecting portion. Therefore, the present invention is characterized in that the connecting portion is formed outside of the metal wiring. In the present embodiment, as illustrated in FIG. 5, in a pixel configuration including a plurality of independent contact holes 8, 8' on the secondary wiring 2 for feeding a drain electric potential to the pixel electrode 9 wherein the respective contact holes 8, 8' are connected to the drain extracting electrode 5', in the event of the vertical leakage within the pixel electrode region connected to the contact hole 8', the drain extracting electrode 5' connected to the contact hole 8' and the connecting portion between electrode slits 13' are cut off by laser cutting. By placing the connecting portion between electrode slits 13' on a to-be-cut portion 26 of the metal wiring which is required to be cut off in the event of the vertical leakage as described above, the work to be cut off by laser irradiation can be reduced. Therefore, the connecting portion between electrode slits 13 can be placed on the metal wiring which is to be cut off in repairing vertical leakage.

Fourth Embodiment

FIG. 6 is a plan view schematically illustrating the shape of pixel electrode on the substrate for a display device according to the fourth embodiment of the present invention.

In repairing a vertical leakage, the inter-electrode connecting portion is cut off by laser irradiation from the back surface of the substrate at the state where the TFT substrate and the CF substrate are attached to each other and therefore, when the connecting portion is overlapped with a light-blocking part such as a black matrix (BM) or a metal wiring, the portion to be subjected to the laser-cutting repairs will become invisible. Therefore, while the first to third embodiments employ configurations in which the inter-electrode connecting portion is not placed under the light-blocking part, the light-blocking part 27 which is not continuous with the light-blocking part of the adjacent pixel may be placed on the to-be-cut portion in order to prevent a light leakage as illustrated in FIG. 6.

Fifth Embodiment

Figure 7A:
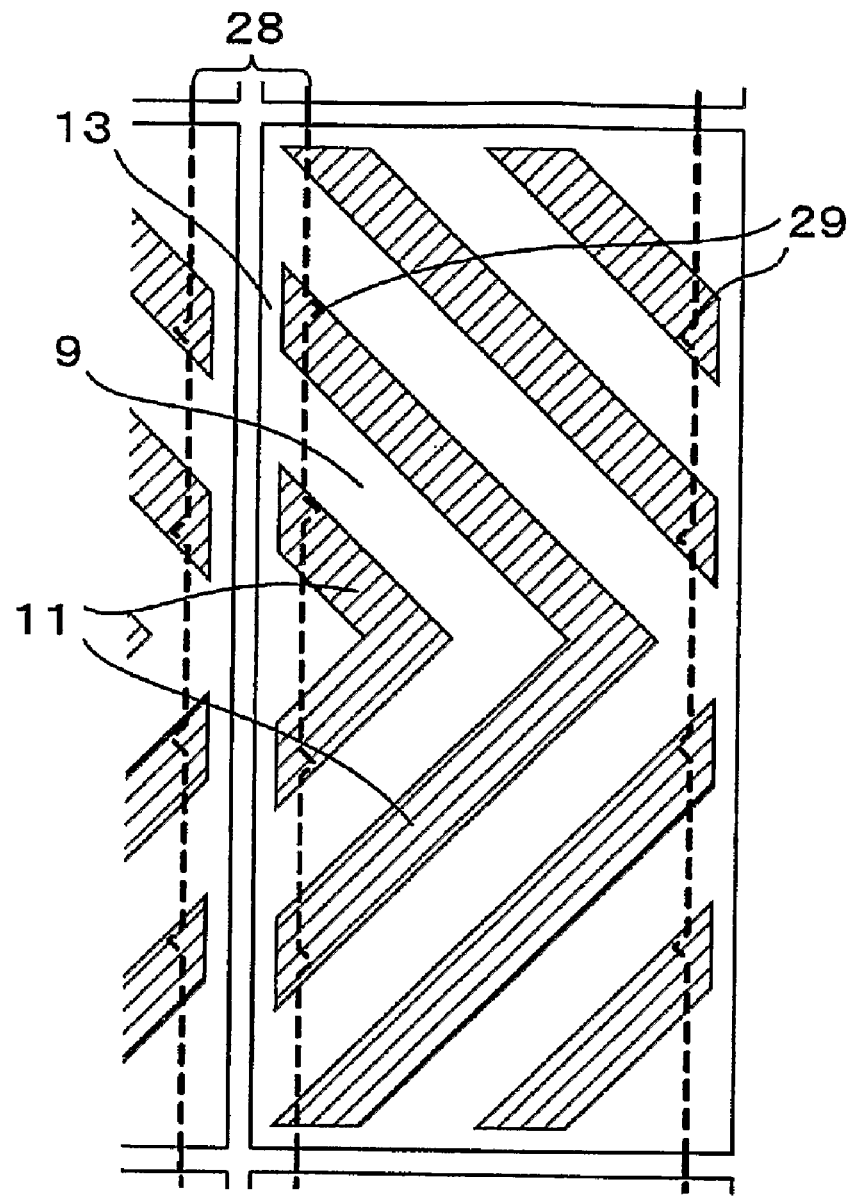
FIGS. 7A, 7B are plan views schematically illustrating a shape of a pixel electrode on a substrate for a display device according to a fifth embodiment of the present invention.
Figure 7B:
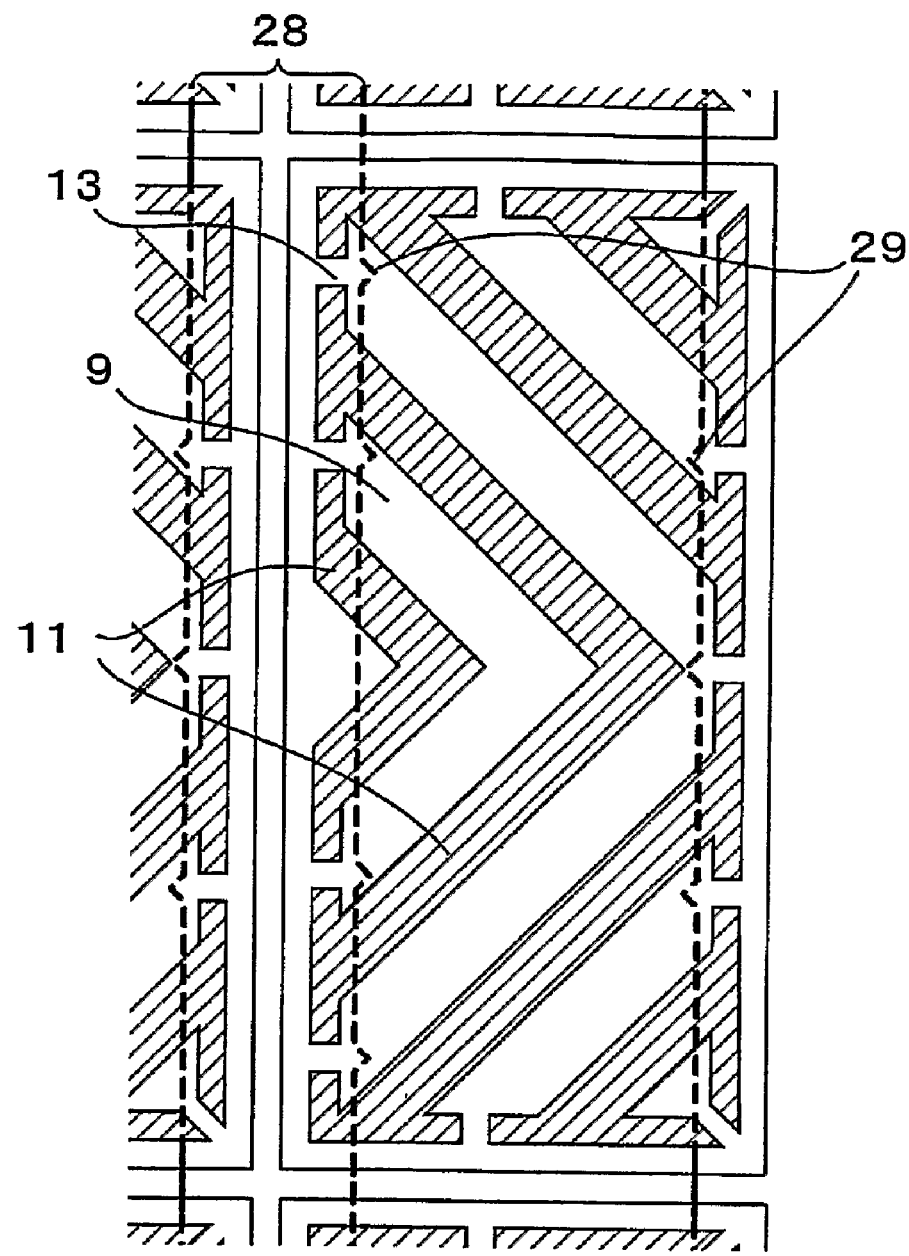

FIGS. 7A and 7B are plan views schematically illustrating the shape of pixel electrode on the substrate for a display device according to the fifth embodiment of the present invention.

While in the fourth embodiment there has been described that the connecting portion between electrode slits 13 may be placed under the light-blocking part (27 in FIG. 6) which is not continuous with the adjacent pixel, the connecting portion between electrode slits 13 may be placed under a light-blocking part (for example, the black matrix 28) continuous with the light-blocking part of the adjacent pixel and may be overlapped with the light-blocking part by placing a mark 29 at the to-be-repaired portion with the light-blocking part for enabling easily recognizing the to-be-repaired portion under the light-blocking part as illustrated in FIG. 7. Although there are illustrated, in FIG. 7, a triangular mark 29 as exemplary patterns of the mark 29, the mark of the to-be-repaired portion may be other patterns such as rectangular patterns, patterns independent of the light-blocking part.

Sixth Embodiment

Figure 8A:
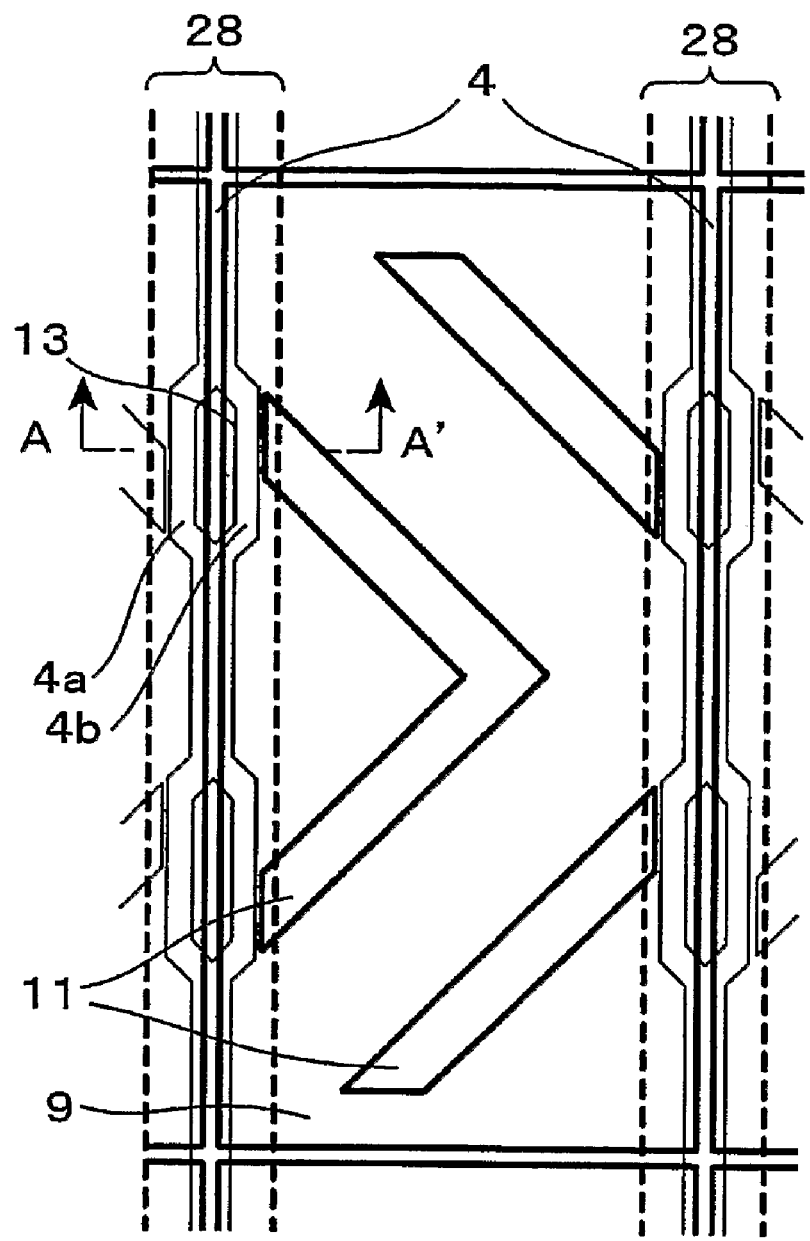
FIGS. 8A, 8B are plan views schematically illustrating a shape of a pixel electrode on a substrate for a display device according to a sixth embodiment of the present invention, and 8C is a cross sectional view schematically illustrating the cross section of the substrate for a display device taken along the line A-A.
Figure 8B:
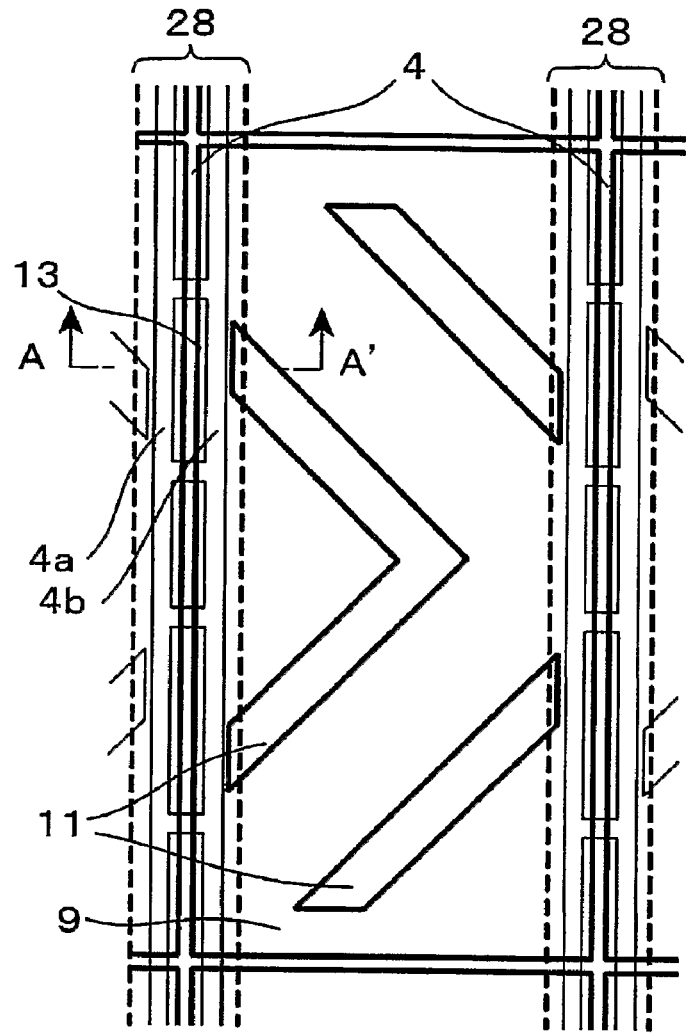
Figure 8C:
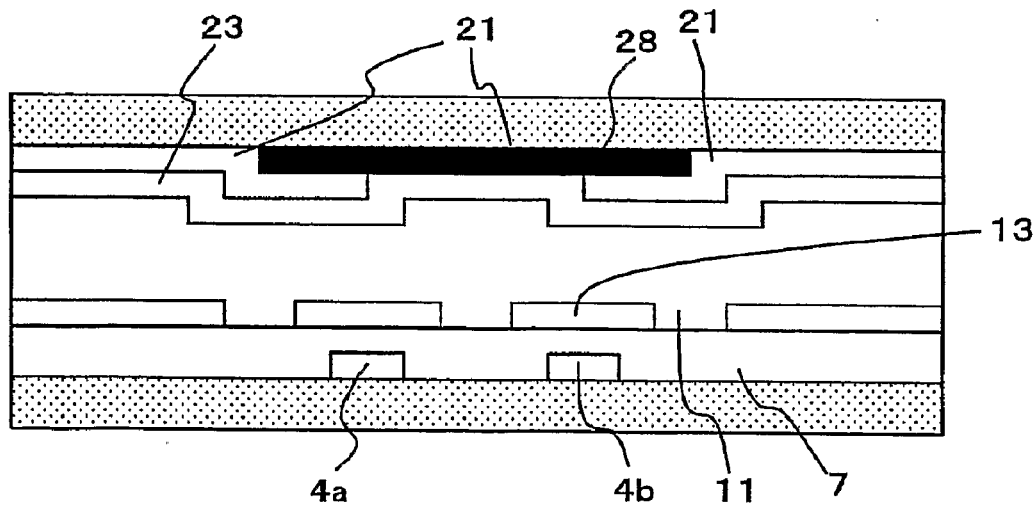

FIGS. 8A, 8B are plan views schematically illustrating the shape of a pixel electrode on the substrate for a display device according to the sixth embodiment of the present invention. 8C is a cross sectional view schematically illustrating the cross section of the substrate for a display device taken along the line A-A in (a) and (b).

When there is a connecting portion between electrode slits 13, namely the portion to be cut off by laser irradiation, near the signal wiring (for example, the data-signal wiring 4), the signal wiring may be cut off together with the connecting portion between electrode slits 13 during laser cutting. Therefore, as illustrated in FIGS. 8A, 8B, the data-signal wiring 4 near the to-be-repaired portion is juxtaposed and is partially connected to each other. Thus, in the event that one wiring 4b of the data-signal wiring 4 is cut off during laser cutting, a data signal may be circuited through the other wiring 4a. While there is provided two data-signal wiring 4 near the portions to be cut off by laser irradiation in FIG. 8, more than two data-signal wiring 4 may be provided.

Seventh Embodiment

FIG. 9 is a plan view schematically illustrating the shape of pixel electrode on the substrate for a display device according to the seventh embodiment of the present invention.

In the event of a vertical leakage at the pixel electrode connected to a contact hole which is the sources of a drain electric potential, if a defective portion is cut away, then the remaining pixel electrode will not be fed with a signal thus causing the entire pixel to be defective. Therefore, as illustrated in FIG. 9, for example, there is formed a contact configuration 32 for connecting adjacent pixel to each other. Thus, in the event of occurrence of the defect, in order to supply the drain electric potential to a pixel electrode 9 which is made discrete as a result of separating the pixel electrode 9 connected to the contact hole 8 with laser-cutting, the intersecting portions 31 of wirings 34 placed between the adjacent electrodes 33 such that it intersect therewith and the electrode 33 connected to contact hole 8a are brought into conduction by laser irradiation. The electrode 33 under the contact hole 8a and the wiring 34 between the contact holes are intersected with each other through an insulating layer. With the aforementioned repairing method, in the even of occurrence of a failure of the contact hole 8, the remaining pixel electrode may be fed with a substantially-normal drain electric potential from the adjacent pixel and thus may function. FIG. 9 illustrates an example of the present invention and it is possible to employ any other configurations which enable supplying the drain electric potential from the adjacent pixel and induce little displaying quality degradation due to placing such configurations.

Eighth Embodiment

FIG. 10 is a plan view schematically illustrating the shape of pixel electrode on the substrate for a display device according to the eighth embodiment of the present invention. In the present embodiment, there will be described a method for repairing a D-Cs leakage.

The D-Cs leakage is a mode of a defect occurring between a drain electrode and a storage capacitor wiring and, therefore, the defective portion can be identified and repaired with laser from the film-surface side (the pixel-electrode side), when the patterning of the active matrix substrate has been completed. As a method for repairing them, as illustrated in FIG. 10, a surrounding area 35 of the pixel electrode on and around a contact hole 8' in which the D-Cs leakage has been visually observed is cut off and the drain-extracting wiring 5' connected to the contact hole 8' is cut off by laser irradiation. The laser used for the repairs may be, for example, a fourth harmonic component (having a wavelength of 266 nm) of a YAG laser, etc. While in FIG. 10 the surrounding area of the electrode is cut away into the shape of the to-be-repaired portion 35, it is more desirable to cut off the connecting portion between electrode slits 13 since this will hardly cause an alignment defect.

Other Embodiments

While in the first to eighth embodiments there have been exemplified a MVA system, the present invention is also applicable to other display systems which divide an alignment of a liquid crystal molecule using an electrode slit. Also, the present invention is applicable to other driving systems such as a dot-inversion type system or a line-inversion type system.

This Nonprovisional application claims priority under 35 U.S.C. 119(a) on Patent Application No. 2004-160115 filed in Japan on May 28, 2004, the entire contents of which are hereby incorporated by reference.

The invention claimed is:

1. An active matrix substrate for a display device comprising:
   an insulating substrate;
   a scanning line;
   a signal line;
   a switching device provided at an intersection of the scanning line and the signal line and including:
      a gate electrode connected to the scanning line;
      a source electrode connected to the signal line; and
      a drain extracting electrode;
   a pixel electrode arranged on a display medium layer side of the active matrix substrate, connected to the drain extracting electrode, and including:
      an electrode slit; and
      an electrical connecting portion of the electrode slit provided outside of a light-blocking region and overlapping the drain extracting electrode;
   a storage capacitor wiring provided on the insulating substrate;
   an interlayer insulation film provided between the storage capacitor wiring and the pixel electrode;
   capacitance electrodes provided above the storage capacitor wiring;
   an insulating layer interposed between the capacitance electrodes and the storage capacitor wiring; and
   contact holes provided in the interlayer insulation film, connected to corresponding ones of the capacitance electrodes, and connecting the drain extracting electrode to the pixel electrode; wherein
   the electrode slit is provided in the pixel electrode between the contact holes such that the electrode slit straddles the storage capacitor wiring.

2. The active matrix substrate for a display device according to claim 1, wherein the light-blocking region is formed from a metal wiring.

3. The active matrix substrate for a display device according to claim 1, wherein the light-blocking region is formed from a black matrix.

4. The active matrix substrate for a display device according to claim 1, wherein the light-blocking region is formed from overlapping color filters.

5. The active matrix substrate for a display device according to claim 1, wherein portions of the pixel electrode connected to the different contact holes are not connected to one another.

6. The active matrix substrate for a display device according to claim 1, wherein there is a plurality of drain extracting electrodes within a single pixel.

7. The active matrix substrate for a display device according to claim 1, wherein the drain extracting electrode is directly connected to one of the capacitance electrodes under the interlayer insulation film.

8. The active matrix substrate for a display device according to claim 1, wherein signal lines near the electrode slit are placed arranged in parallel and portions of respective signal lines are connected to one another.

9. The active matrix substrate for a display device according to claim 1, further comprising a repairing configuration arranged to supply a drain electric potential from an adjacent pixel to the pixel electrode provided with the electrode slit.

10. A method for repairing a display device including an electrical short-circuit in the active matrix substrate for a display device according to claim 1, wherein, in the event of an electrical short-circuit between the electrodes on the active matrix substrate and the opposed substrate, the portion suffering from the electrical short-circuit is cut away by laser irradiation from the back surface of of the active matrix substrate.

11. A method for repairing a display device according to claim 10, wherein a fundamental harmonic wave of an yttrium-aluminum-garnet laser is used to cut away the portion suffering from the electrical short-circuit.

12. A method for repairing an electrical short-circuit in the active matrix substrate for a display device according to claim 1, wherein, in the event of an electrical short-circuit between the drain extracting electrode and the storage capacitor wiring, the portion suffering from the electrical short-circuit is cut away by laser irradiation from a pixel-electrode side of the active matrix substrate.

13. The method for repairing the active matrix substrate for a display device according to claim 12, wherein a fourth harmonic wave of an yttrium-aluminum-garnet laser is used to cut away the portion suffering from the electrical short-circuit.

14. A liquid crystal display device including the active matrix substrate for a display device according to claim 1, wherein the electrode slit divides an alignment of liquid crystal molecules.

15. A display device comprising:
   an active matrix substrate according to claim 1;
   an opposed substrate arranged to oppose the active matrix substrate and including a common electrode arranged to oppose the pixel electrode on a display medium layer side of the opposed substrate; and
   a display medium layer interposed between the active matrix substrate and the opposed substrate.

* * * * *